(12) United States Patent
Batke et al.

(10) Patent No.: US 9,374,387 B2
(45) Date of Patent: Jun. 21, 2016

(54) HARDWARE-BASED GRANULAR TRAFFIC STORM PROTECTION

(71) Applicant: Rockwell Automation Technologies, Inc., Mayfield Heights, OH (US)

(72) Inventors: Brian A. Batke, Novelty, OH (US); Sivaram Balasubramanian, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 399 days.

(21) Appl. No.: 13/650,308

(22) Filed: Oct. 12, 2012

(65) Prior Publication Data

US 2014/0105004 A1    Apr. 17, 2014

(51) Int. Cl.
  *H04L 12/851* (2013.01)
  *H04L 12/823* (2013.01)
  *H04L 29/06* (2006.01)

(52) U.S. Cl.
  CPC ............ *H04L 63/1458* (2013.01); *H04L 47/24* (2013.01); *H04L 47/32* (2013.01); *H04L 63/0227* (2013.01)

(58) Field of Classification Search
  CPC ............ H04L 12/2668; H04L 12/2763; H04L 12/2676
  USPC .............. 370/230, 230.1, 232–235, 413, 428, 370/429
  See application file for complete search history.

(56) References Cited

U.S. PATENT DOCUMENTS

| | | | |
|---|---|---|---|
| 6,185,185 B1 | 2/2001 | Bass et al. | |
| 7,274,665 B2 | 9/2007 | Kesavan | |
| 7,286,552 B1 * | 10/2007 | Gupta et al. | 370/413 |
| 2002/0194350 A1 * | 12/2002 | Lu | H04L 29/06 709/229 |
| 2003/0058795 A1 * | 3/2003 | Lansing et al. | 370/235 |
| 2004/0062200 A1 | 4/2004 | Kesavan | |
| 2005/0018618 A1 | 1/2005 | Mualem et al. | |
| 2005/0100020 A1 | 5/2005 | Hata et al. | |
| 2005/0195840 A1 * | 9/2005 | Krapp et al. | 370/401 |
| 2006/0109376 A1 * | 5/2006 | Chaffee et al. | 348/423.1 |
| 2008/0080543 A1 * | 4/2008 | Hickox et al. | 370/419 |
| 2008/0239961 A1 * | 10/2008 | Hilerio | H04L 41/5009 370/235 |
| 2008/0307087 A1 | 12/2008 | Kazmar et al. | |
| 2010/0274897 A1 * | 10/2010 | Yong et al. | 709/224 |

OTHER PUBLICATIONS

Open DeviceNet Vendor Association, The Common Industrial Protocol (CIP) and the Family of CIP Networks, 2006, 92 pages, http://www.odva.org/Portals/0/Library/Publications_Numbered/PUB00123R0_Common%20Industrial_Protocol_and_Family_of_CIP_Netw.pdf.*
European Search Report; EP2720412A1;Dec. 11, 2013.

* cited by examiner

*Primary Examiner* — Hoon J Chung
(74) *Attorney, Agent, or Firm* — Boyle Fredrickson, S.C.

(57) ABSTRACT

Aspects of the present invention provide a device, method and system which utilize hardware-based granular evaluation of industrial control protocol packets to withstand traffic storms. In an embodiment, packet evaluation circuitry coupled to a port may be adapted to evaluate one or more protocol fields contained in each inbound packet before switching circuitry can send the inbound packet to the proper destination. The inbound packet may be sent by the switching circuitry if it is a particular message, or may be selectively inhibited from being sent by the switching circuitry if the inbound packet does not contain the particular message for being sent and if the total number of bytes of the inbound packet type exceeds a threshold for the outbound port during a given period of time. As such, critical industrial applications may continue to operate in the presence of a traffic storm.

20 Claims, 3 Drawing Sheets

US 9,374,387 B2

HARDWARE-BASED GRANULAR TRAFFIC STORM PROTECTION

BACKGROUND OF THE INVENTION

The present invention relates to industrial control systems and, in particular, hardware-based granular traffic storm protection in industrial control systems.

Control networks used for communication among industrial controllers differ from standard networks in that they must operate to communicate data reliably within predefined time limits. Often this is accomplished by additional communication protocols that reserve network bandwidth and schedule messages to prevent collisions and the like that can introduce unpredictable delay into network communications. Such networks commonly used in industrial control systems include, for example, ControlNet, DeviceNet, EtherNet/IP and Sercos, whose specifications are published and whose Common Industrial Protocol (CIP) is used broadly by a number of manufacturers and suppliers.

Industrial systems, like many other systems, may also be susceptible to application disruption in the presence of traffic storms. For example, bursts of messages caused by new devices coming online, malfunctioning devices sending broadcast traffic, and intentional disruption from an attacker sending broadcast or unicast messages could all be potential sources of traffic storms causing such disruption.

Current implementations may perform hardware-based filtering of broadcast, multicast, or unicast packets generally, and when a threshold is reached, the packets may hr dropped or the port disabled, regardless of whether the packets provide critical industrial application messages or less important extraneous information. Some implementations may monitor messages more specifically in software or firmware and inhibit processing of or otherwise dispose of low priority messages in a traffic storm. However, such software or firmware processing requires CPU processing resources which, when provided, takes resources away from other application processing. This may become particularly problematic in industrial applications in which a continuous flow of message traffic may be critical for maintaining an industrial process, such as one or more machines for manufacturing that are in motion.

SUMMARY OF THE INVENTION

The present inventors have recognized that messages may be advantageously monitored in hardware for industrial control systems. As such, critical industrial applications may continue to operate in the presence of a traffic storm without loss of integrity.

Aspects of the present invention provide in one embodiment a network device for an industrial control system comprising one or more ports with each port adapted to communicate industrial control protocol packets over an industrial control network. A buffer memory may optionally be coupled to each port that is adapted to store inbound packets in an inbound queue and packets in an outbound queue. Switching circuitry may be coupled to each port that is adapted to send inbound packets from each port to their proper destination, such as to the outbound queue of another port or to a processor and/or industrial processing circuitry, based on addressing information contained in the inbound packets, Packet evaluation circuitry may be coupled to each port, or to optional buffer memory, that is adapted for each of the inbound packets to (a) evaluate one or more protocol fields, such as the address (e.g., source or destination(s)), port number, communication type (e.g., broadcast, unicast or multicast), application protocol message type (e.g., CIP motion, CIP I/O or IEEE 1588) or stateful protocol fields such as established valid CIP Connection ID, and at various layered protocol levels, contained in the inbound packet before the switching circuitry can send the inbound packet to the proper destination; (b) allow the inbound packet to be sent by the switching circuitry if the inbound packet contains a particular message indicated by the one or more evaluated protocol fields; and (c) selectively inhibit the inbound packet from being sent by the switching circuitry if the inbound packet does not contain the particular message for being sent and if the total number of bytes of the inbound packet type exceeds a threshold for the outbound port during a given period of time.

Layered protocol levels may include, for example, the control network level (e.g., ControlNet, DeviceNet, EtherNet/IP or Sercos implementation level), the Internet Protocol level (e.g., TCP or UDP) and the application level, including for various types of protocols. In addition, indication of a particular message for being sent for in an inbound packet may be set and may be configurable. For example, a particular message for being sent may be identified based on the presence of a CIP motion packet, a CIP I/O packet, or an IEEE 1588 packet, or whether the inbound packet has originated from a valid CIP Connection ID, or from a valid CIP device ID.

Protocol fields that are evaluated may be configured via register settings. Inbound packets may be inhibited from being sent by being discarded or by being moved to a separate memory and queued for subsequent processing.

Another embodiment may provide a method for communicating packets over an industrial control network comprising (a) receiving an inbound industrial control protocol packet communicated over the industrial control network; and (b) evaluating one or more protocol fields of the inbound packet and determining in hardware if the protocol field equals a particular value, and sending the inbound packet to the appropriate address if the protocol field equals the particular value.

One of the protocol fields may indicate, for example, if the inbound packet is a CIP motion packet or a CIP I/O packet or an IEEE 1588 packet, or whether the inbound packet has originated from a valid CIP Connection ID or a valid CIP device ID. The method may further comprise discarding the inbound packet if the protocol field does not equal the particular value and if the total number of bytes of the inbound packet type exceeds a threshold for the outbound port during a given period of time, or moving the inbound packet to a separate memory and queuing for subsequent processing if the protocol field does not equal the particular value and if the total number of bytes of the inbound packet type exceeds a threshold for the outbound port during a given period of time. The threshold may be set to indicate a maximum storage of inbound packets in the inbound queue.

Yet another embodiment may provide an industrial control system comprising a plurality of switching nodes forwarding and receiving industrial control protocol packets between ports, each switching node having at least a first and second port connectable to network media, the switching nodes arranged in a ring wherein the first and second ports of each switching node connect to different switching nodes of the ring. Each switching node may be adapted to evaluate in hardware one or more protocol fields contained in received packets before forwarding the packets to any other switching node. Each switching node may send the inbound packet to the proper destination if the inbound packet contains a particular message indicated by the one or more evaluated protocol fields. Each switching node may also selectively inhibit the received packets from being forwarded to any other switching node based on the one or more evaluated protocol fields and if the total number of bytes of the inbound packet type at least equals a threshold for the outbound port during a given period of time.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
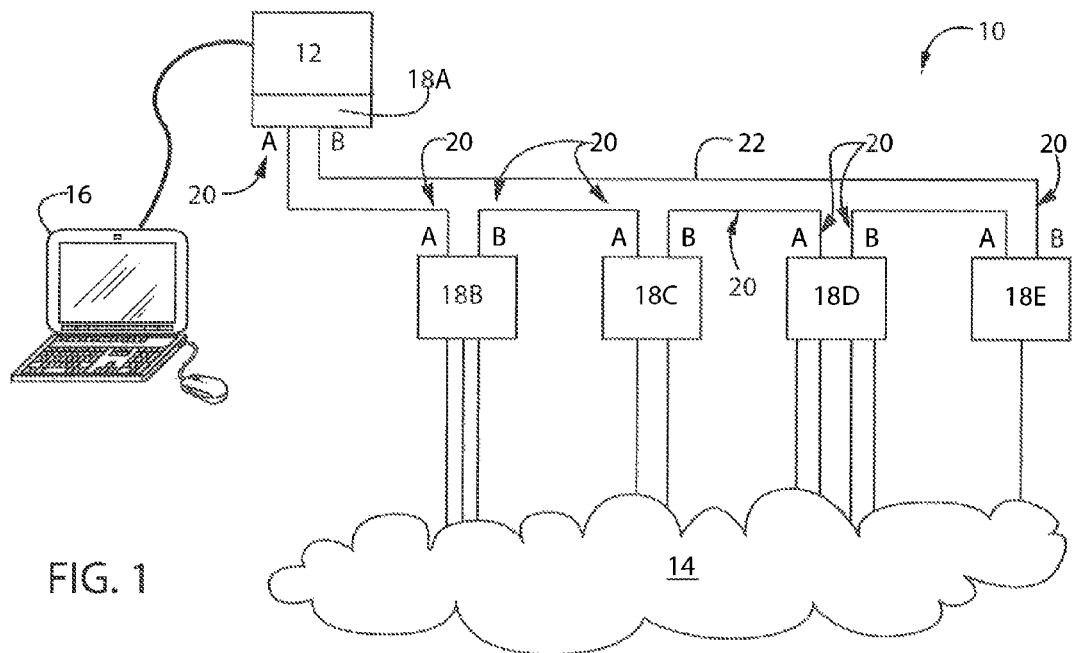
FIG. 1 is a diagram of an industrial control network configured for use in accordance with an embodiment of the present invention.

Referring now to the drawings wherein like reference numbers correspond to similar components throughout the several views and, specifically, referring to FIG. 1, the present invention shall be described in the context of an industrial control network 10. The industrial control network 10 may include, for example, a programmable logic controller 12 executing a stored program to provide for real-time control of an industrial process 14. Real-time control, in this context, means control that is subject to well-defined maximum delay periods between an output signal generated by the programmable logic controller 12 and electrical signal sent to an actuator in the industrial process 14, and similarly well-defined maximum delay period between the generation of a signal by a sensor in the industrial process 14 and its receipt and processing by the programmable logic controller 12.

Normally the programmable logic controller 12 includes an electronic computer executing a stored program providing detailed logic for the necessary control. Often the stored program is generated uniquely for the particular industrial process 14.

The programmable logic controller 12 may communicate with a terminal device 16 that allows for the configuration of the industrial controller, including the generation of the control program and the initialization of its components. The programmable logic controller 12 may also communicate with a network node 18 (in this example network node 18a) implementing protocols suitable for Ethernet, ControlNet, DeviceNet, EtherNet/IP or Sercos or Internet Protocol (IP) or other control network protocols communicating industrial control protocol packets. The network node 18a may be an Ethernet node having a processor 44, one or more ports 20 two ports, labeled A and B, respectively, shown by way of example only) and a switch 45 to switch network traffic between one or more ports and the processor 44. In this example, the node 18a may provide for layer 2 protocol to implement a full/half duplex IEEE 802.3 Ethernet network.

Here, two ports shown by way of example only, ports A and B, each connect to network media 22, for example, copper conductors or fiber optic links having a bandwidth of at least 100 Mbps in full duplex mode. The media 22 may connect to other network nodes 18b, 18c, 18d and 18e, each also having a processor 44, one or more ports 20 (A and B) and a switch 45.

The media may, for example, interconnect the ports 20 of the network nodes 18 to produce various, topologies, including a ring topology of switching nodes, that is, one in which by following the media 22 one may arrive successively at each node 18 once passing through each of the ports A and B of each of the nodes 18. The ring topology represents a physical connection and is independent of whether packets or frames may actually pass through the ports A and B as may be prevented by failure of the media 22 or of one or more network nodes 18. The ring topology is further described in U.S. patent application Ser. No. 12/493,838 and is hereby incorporated by reference in its entirety. Although a ring topology is described by way of example only, other types of topologies, such as a bus, star or linear topology or hybrid, may be similarly implemented.

Figure 2:
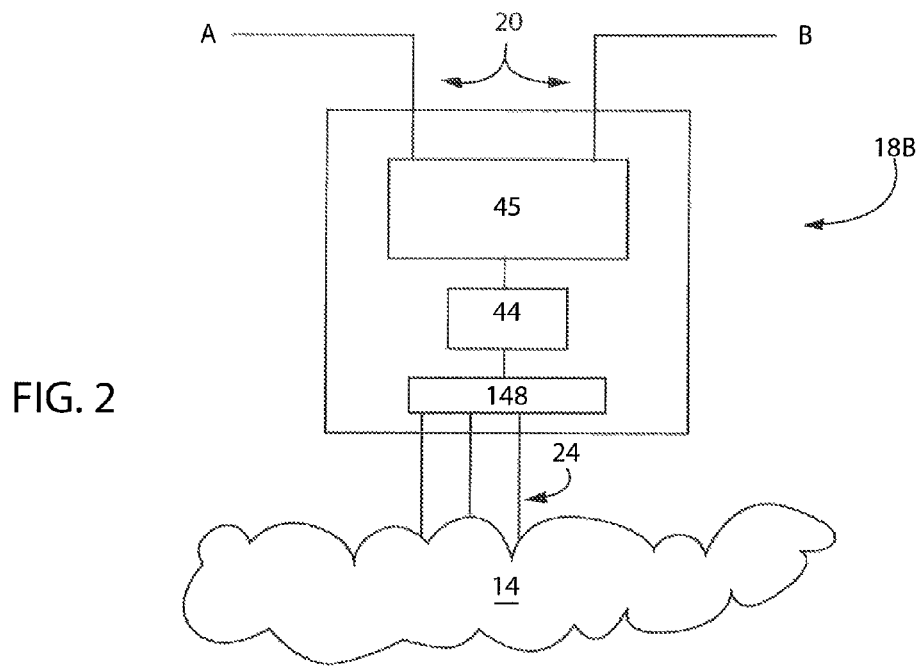
FIG. 2 is a logical diagram of a node of the industrial control network shown in FIG. 1 in accordance with an embodiment of the present invention.

Referring now to FIG. 2, a logical diagram of an example node 18b in accordance with an embodiment of the present invention is shown. The network node 18b may include a processor 44, one or more ports 20 (labeled A and B respectively), a switch 45 to switch network traffic between one or more ports and the processor 44, and industrial processing circuitry 48 for communicating with I/O circuits or other control devices providing signals along conductors 24 to and from the industrial process 14 for control thereof.

Figure 3:
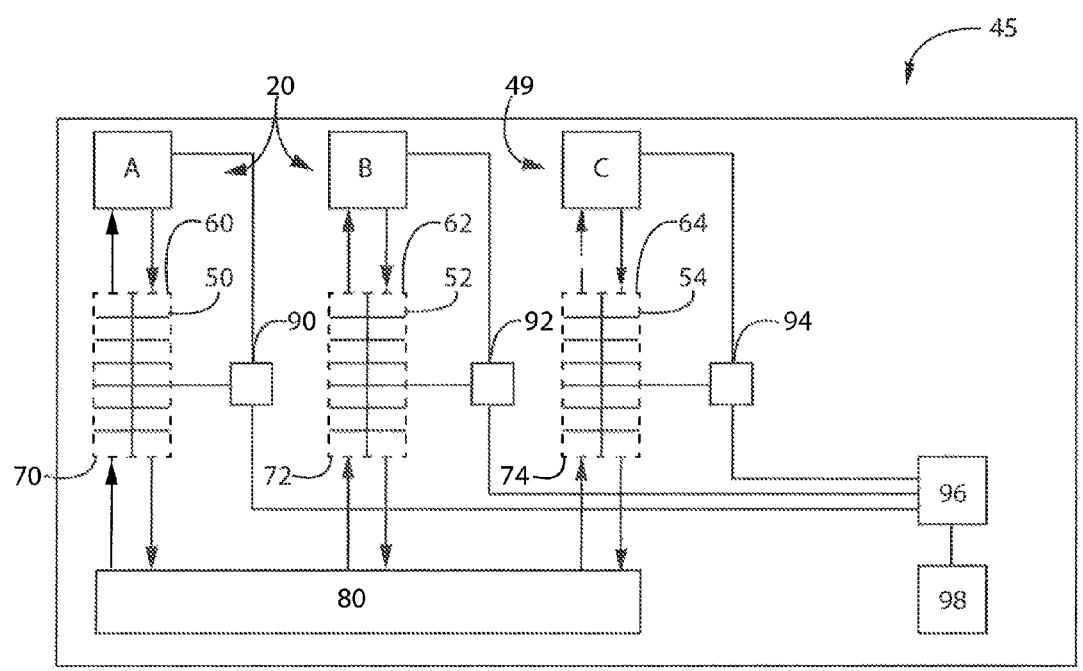
FIG. 3 is a logical diagram of a switching element of the node shown in FIG. 2 in accordance with an embodiment of the present invention.

Referring now to FIG. 3, a logical diagram of the switch 45, which may be implemented, for example, as an embedded switch within an application specific integrated circuit (ASIC) or a field programmable gate array (FPGA) as known in the art, is shown in accordance with an embodiment of the present invention. The switch 45 comprises one or more ports 20 (labeled A and B respectively) and an additional port 49 (labeled C). Each port 20 is adapted to communicate industrial control protocol packets over an industrial control network. External to the switch 45, ports A and B may each connect to network media 22, similarly as described above, and port C may connect to the processor 44. Within the switch 45, ports A, B and C may each have optional buffer memories 50, 52 and 54 coupled to the port, respectively. The buffer memories 50, 52 and 54 may be adapted to store inbound industrial control protocol packets in inbound queues 60, 62 and 64, and outbound industrial control protocol packets in outbound queues 70, 72 and 74, respectively. Switching circuitry 80, which may be a crossbar switch, for example, may be coupled to each of the buffer memories 50, 52 and 54. The switching circuitry 80 is adapted to send inbound packets from the inbound queues of each port to their proper destinations, such as to the outbound queues of other ports, based on addressing information contained in the inbound packets.

The ports A, B and C, or optionally the buffer memories 50, 52 and 54, may each have hardware-based granular packet evaluation circuitry 90, 92 and 94 coupled thereto, respectively. The packet evaluation circuitry may be coupled to configuration logic 96, which may in turn be coupled to configuration registers 98. The packet evaluation circuitry is adapted, for each of the inbound packets, to evaluate one or more protocol fields at various layered protocol levels contained in the inbound packet before the switching circuitry 80 can send the inbound packet to the proper destination, such as the outbound queue of another port. As described above, protocol fields at various layered protocol levels may include, for example, the address (e.g., source or destination(s)), port number, communication type (e.g., broadcast, unicast or multicast), message type (e.g., CIP motion, CIP I/O or IEEE 1588) or established connections (e.g., valid CIP Connection ID or valid CIP device ID).

For the industrial system, the one or more protocol fields may advantageously convey whether the inbound packet relates to important or priority message traffic, which may include, for example, motion synchronization packets, such as Common Industrial Protocol (CIP) motion packets, and/or time synchronization packets, such as an IEEE 1588 precision time protocol packets. The one or more protocol fields may also convey, for example, whether an inbound packet has originated from a valid CIP Connection ID or a valid CIP device ID, and whether the inbound packet is a broadcast, multicast, or unicast packet. Protocol fields may be set forth in and/or compared to a packet industrial function classification table. Particular protocol fields evaluated may be configured via the configuration logic 96 and the configuration registers 98, which may be initialized and/or updated, for example, by local hardware, firmware and/or the programmable logic controller 12.

The packet evaluation circuitry is also adapted, for each of the inbound packets, to allow the inbound packet to be sent by the switching circuitry if the inbound packet contains a particular message indicated by the one or more evaluated protocol fields, which may be important or priority message traffic. The packet evaluation circuitry is also adapted, for each of the inbound packets, to selectively inhibit the inbound packet from being sent by the switching circuitry, such as to the outbound queue of another port, if the inbound packet does not contain a particular message and if the total number of bytes of the inbound packet type exceeds a threshold for the outbound port during a given period of time. Inhibiting the inbound packet from being sent may include discarding the inbound packet altogether, or in a preferred embodiment, moving the inbound packet to a separate, larger memory and queued for possible subsequent processing by the switching circuitry 80.

In addition, the thresholds for an outbound port at which inbound packet types may be inhibited from being sent by the switching circuitry may also be configured via the configuration logic 96 and the configuration registers 98. For example, a threshold may be set to require the total number of bytes of the inbound broadcast packets exceed 512 bytes per second before inbound packets of broadcast type may be inhibited on an outbound port 20 or 49. Moreover, a plurality of protocol fields and threshold levels may be arranged, and updated, to inhibit inbound packets from being sent by the switching circuitry at varying degrees. For example, a first, lesser degree of inhibiting at a first threshold level (e.g. total number of bytes of the inbound broadcast packets exceed 512 bytes per second) may be set, along with a second, greater degree of inhibiting at a second threshold level (e.g. total number of bytes of the inbound broadcast, multicast or unicast packets exceeds 4096 bytes per second).

Figure 4:
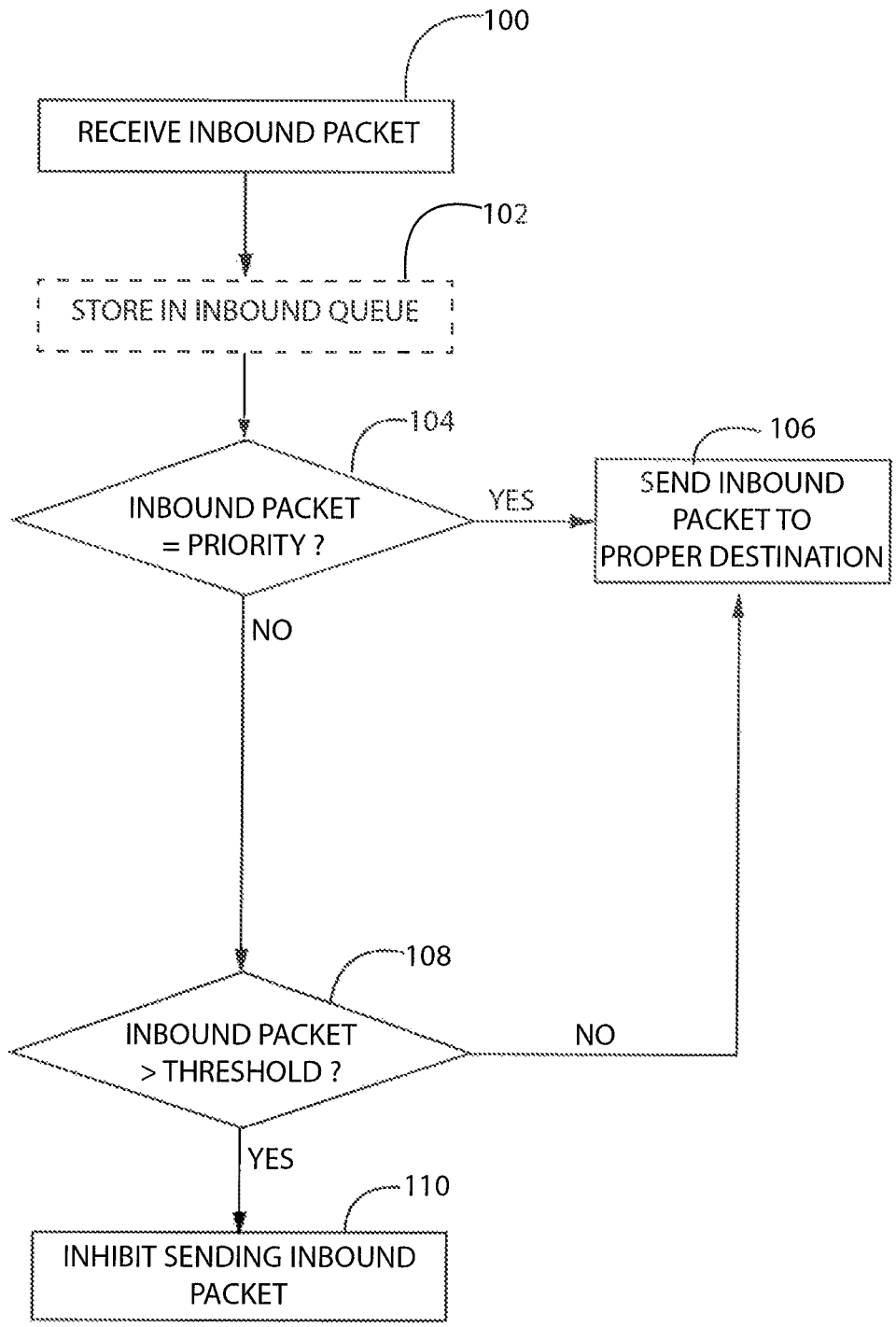
FIG. 4 is a flowchart in accordance with an embodiment of the present invention.

Referring now to FIG. 4, a flowchart in accordance with an embodiment of the present invention is shown. A node may receive an inbound industrial control protocol packet communicated from another node over the industrial control network 100. The node may optionally store the inbound packet in the inbound queue of a buffer memory 102. The node may then determine if the inbound packet contains a particular message indicated by the one or more evaluated protocol fields 104. If the inbound packet contains a particular message (true), the packet evaluation circuitry may allow the inbound packet to be sent by the switching circuitry to the proper destination 106. However, if the inbound packet does not contain a particular message (false), and if the total number of bytes of the inbound packet type exceeds a threshold for the outbound port during a given period of time 108 (true), the packet evaluation circuitry may selectively inhibit the inbound packet from being sent by the switching circuitry 110. Alternatively, if the inbound packet does not contain a particular message (false) 108, but the total number of bytes of the inbound packet type does not exceed a threshold for the outbound port during a given period of time 108 (false), the packet evaluation circuitry may allow the inbound packet to be sent by the switching circuitry to the proper destination 106.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A network device for an industrial control system comprising:
   a port adapted to communicate industrial control protocol packets over an industrial control network;
   a switching circuitry coupled to the port adapted to send inbound packets from the port to a destination based on addressing information contained in the inbound packets; and
   a packet evaluation circuitry coupled to the port, wherein the packet evaluation circuitry is adapted for each of the inbound packets to:
   (a) evaluate one or more protocol fields contained in the inbound packet to identify a protocol field relating to real-time industrial control before the switching circuitry can send the inbound packet;
   (b) prevent the inbound packet from being inhibited and allow the inbound packet to be sent by the switching circuitry if the inbound packet contains a particular message relating to real-time industrial control indicated by the one or more evaluated protocol fields, particular message indicating that the device generating the inbound packet has an established connection in the industrial control system; and
   (c) selectively inhibit the inbound packet from being sent by the switching circuitry if the inbound packet does not contain the particular message for being sent and if a total number of bytes of the inbound packet type exceed a threshold for an outbound port during a given period of time,
   wherein the inbound packet contains the particular message for being sent if an evaluated protocol field further indicates a valid Connection ID or a valid device ID.

2. The network device of claim 1, wherein the inbound packet contains the particular message for being sent if an evaluated protocol field further indicates a CIP motion packet.

3. The network device of claim 1, wherein the inbound packet contains the particular message for being sent if an evaluated protocol field further indicates a valid CIP I/O packet.

4. The network device of claim 1, wherein the inbound packet contains the particular message for being sent if an evaluated protocol field further indicates an IEEE 1588 packet.

5. The network device of claim 1, wherein the valid Connection ID is a valid CIP Connection ID or the valid device ID is a valid CIP device ID.

6. The network device of claim 1, wherein one of the one or more protocol fields further indicates if the inbound packet is part of a broadcast, unicast or multicast message.

7. The network device of claim 1, wherein the one or more protocol fields evaluated is configured is register settings.

8. The network device of claim 1, wherein the inbound packet is inhibited from being sent by being discarded.

9. The network device of claim 1, wherein the inbound packet is inhibited from being sent by being moved to a separate memory and queued for subsequent processing.

10. The network device of claim 1 further comprising a buffer memory coupled to the port that is adapted to store inbound packets in an inbound queue and outbound packets in an outbound queue.

11. The network device of claim 1 further comprising:
    a second port adapted to communicate industrial control protocol packets over an industrial control network;
    the switching circuitry coupled to the second port adapted to send inbound packets from the second port to a destination based on addressing information contained in the inbound packets; and
    the packet evaluation circuitry coupled to the second port, wherein the packet evaluation circuitry is adapted for each of the inbound packets to
    (a) evaluate one or more protocol fields contained in the inbound packet to identify a protocol field relating to real-time industrial control before the switching circuitry can send the inbound packet;
    (b) prevent the inbound packet from being inhibited and allow the inbound packet to be sent by the switching circuitry if the inbound packet contains a particular message relating to real-time industrial control indicated by the one or more evaluated protocol fields, the particular message indicating that the device generating the inbound packet has an established connection in the industrial control system; and
    (c) selectively inhibit the inbound packet from being sent if the inbound packet does not contain the particular message for being sent and if the total number of bytes of the inbound packet type exceeds a threshold for an outbound port during a given period of time.

12. A method for communicating packets over an industrial control network comprising:
    (a) receiving an inbound industrial control protocol packet communicated over an industrial control network;
    (b) evaluating one or more protocol fields contained in the inbound packet to identify a protocol field relating to real-time industrial control before sending the inbound packet to a destination;
    (c) preventing the inbound packet from being inhibited and allowing the inbound packet to be sent to the destination if the inbound packet contains a particular message relating to real-time industrial control indicated by the one or more evaluated protocol fields, the particular message indicating that the device generating the inbound packet has an established connection in the industrial control system; and
    (d) selectively inhibiting the inbound packet from being sent if the inbound packet does not contain the particular message for being sent and if a total number of bytes of the inbound packet type exceed a threshold for an outbound port during a given period of time, wherein the inbound packet contains the particular message for being sent if an evaluated protocol field further indicates a valid Connection ID or a valid device ID.

13. The method of claim 12, wherein the inbound packet contains the particular message for being sent if an evaluated protocol field further indicates a CIP motion packet.

14. The method of claim 12, wherein the inbound packet contains the particular message for being sent if an evaluated protocol field further indicates a OP I/O packet.

15. The method of claim 12, wherein the inbound packet contains the particular message for being sent if an evaluated protocol field further indicates an IEEE 1588 packet.

16. The method of claim 12, wherein the valid Connection ID is a valid CIP Connection ID or the valid device ID is a valid CIP device ID.

17. The method of claim 12, further comprising storing the inbound packet in an inbound queue and outbound packets in an outbound queue.

18. The method of claim 12, wherein selectively inhibiting the inbound packet further comprises discarding the inbound packet.

19. The method of claim 12, wherein selectively inhibiting the inbound packet further comprises queuing the inbound packet for subsequent processing.

20. An industrial control system comprising:
   a plurality of switching nodes receiving and forwarding industrial control protocol packets between ports, each switching node having at least a first and second port connectable to network media, the switching nodes arranged in a ring wherein the first and second ports of each switching node connect to different switching nodes of the ring;
wherein each switching node is adapted to:
(a) evaluate in hardware one or more protocol fields contained in a received packet to identify a protocol field relating to real-time industrial control before forwarding the packet to any other switching node;
(b) prevent the received packet from being inhibited and allow the received packet to be sent if the received packet contains a particular message relating to real-time industrial control indicated by the one or more evaluated protocol fields, the particular message indicating that the device generating the inbound packet has an established connection in the industrial control system; and
(c) selectively inhibit the received packet from being sent to an outbound port if the received packet does not contain the particular message for being sent and if a total number of bytes of the received packet type exceed a threshold for the outbound port during a given period of time,
wherein the inbound packet contains the particular message for being sent if an evaluated protocol field further indicates a valid Connection ID or a valid device ID.

\* \* \* \* \*